(12) United States Patent
Amador (10) Patent No.: US 11,428,323 B2
(45) Date of Patent: Aug. 30, 2022

(54) FLOATING BRUSH SEAL ASSEMBLY (71) Applicant: United Technologies Corporation, Farmington, CT (US)

(72) Inventor: Armando Amador, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 259 days.

(21) Appl. No.: 16/385,094

(22) Filed: Apr. 16, 2019

(65) Prior Publication Data

US 2020/0332899 A1 Oct. 22, 2020

(51) Int. Cl.
*F16J 15/3288* (2016.01)
*F16J 15/324* (2016.01)
*F16J 15/3268* (2016.01)

(52) U.S. Cl.
CPC ......... *F16J 15/3288* (2013.01); *F16J 15/324* (2013.01); *F16J 15/3268* (2013.01)

(58) Field of Classification Search
CPC ..... F16J 15/3288; F16J 15/324; F16J 15/3268
See application file for complete search history.

(56) References Cited

U.S. PATENT DOCUMENTS

| | | | | |
|---|---|---|---|---|
| 5,265,412 A | * | 11/1993 | Bagepalli | F02K 1/805 60/800 |
| 5,351,971 A | * | 10/1994 | Short | F16J 15/3288 277/355 |
| 5,474,305 A | * | 12/1995 | Flower | F16J 15/3288 277/355 |
| 5,568,931 A | * | 10/1996 | Tseng | F16J 15/3288 277/355 |
| 5,997,004 A | * | 12/1999 | Braun | F16J 15/3288 277/352 |
| 6,226,975 B1 | * | 5/2001 | Ingistov | F01D 11/025 415/170.1 |
| 6,378,873 B1 | * | 4/2002 | Mayer | F16J 15/28 277/355 |
| 6,416,057 B1 | * | 7/2002 | Adams | F16J 15/3288 277/352 |
| 6,609,888 B1 | | 8/2003 | Ingistov | |

(Continued)

FOREIGN PATENT DOCUMENTS

| | | |
|---|---|---|
| EP | 0549652 A1 | 8/1996 |
| EP | 1653129 A1 | 5/2006 |
| EP | 2357385 A1 | 8/2011 |

OTHER PUBLICATIONS

European search report for patent application No. 20 16 8078 dated Sep. 4, 2020.

(Continued)

*Primary Examiner* — Eugene G Byrd
(74) *Attorney, Agent, or Firm* — Bachman & LaPointe, P.C.

(57) ABSTRACT

A floating brush seal assembly includes a ring-shaped housing defining a radially inwardly open internal cavity; a brush seal in the cavity and having bristles extending radially inwardly and offset to seal against a rotating body; a radial spring positioned to exert a radial inwardly directed force against the brush seal relative to the housing; and an axial spring positioned to exert an axially directed force against the brush seal relative to the housing.

14 Claims, 8 Drawing Sheets

(56) References Cited

U.S. PATENT DOCUMENTS

| | | | | |
|---|---|---|---|---|
| 6,669,203 B1* | 12/2003 | Mortzheim | .......... | F16J 15/3288 |
| | | | | 277/355 |
| 6,685,190 B1* | 2/2004 | Mayer | .................. | F16J 15/3288 |
| | | | | 277/355 |
| 7,413,194 B2* | 8/2008 | Wright | ................. | F16J 15/3288 |
| | | | | 277/355 |
| 7,461,847 B2* | 12/2008 | Short | .................... | F01D 11/001 |
| | | | | 277/355 |
| 7,832,734 B2* | 11/2010 | Beichl | ................. | F16J 15/3288 |
| | | | | 277/355 |
| 8,317,464 B2 | 11/2012 | Alamsetty et al. | | |
| 8,794,918 B2* | 8/2014 | Ali | .......................... | F01D 11/08 |
| | | | | 415/230 |
| 9,234,592 B2 | 1/2016 | Inoue | | |
| 9,255,486 B2* | 2/2016 | Lu | .......................... | F01D 11/001 |
| 9,500,094 B1 | 11/2016 | Eng et al. | | |
| 2003/0102630 A1* | 6/2003 | Dine | ..................... | F01D 11/025 |
| | | | | 277/355 |
| 2004/0012149 A1* | 1/2004 | Laurello | ................... | F02C 7/28 |
| | | | | 277/355 |
| 2011/0200432 A1* | 8/2011 | Alamsetty | ............ | F16J 15/3288 |
| | | | | 415/230 |
| 2015/0300191 A1* | 10/2015 | Morreale | ................ | B23P 19/04 |
| | | | | 415/174.2 |
| 2016/0061330 A1* | 3/2016 | Davis | .................. | F16J 15/3268 |
| | | | | 277/355 |

OTHER PUBLICATIONS

European office action for patent application No. 20 168 078 dated Aug. 31, 2021.

* cited by examiner

FLOATING BRUSH SEAL ASSEMBLY

BACKGROUND

The invention relates to a seal assembly and, more particularly, to a seal assembly for sealing main shaft bearing compartments of a gas-turbine engine.

Sealing of the main shaft bearing compartments is typically achieved primarily using carbon seals and, to a lesser extent, labyrinth seals. These seals seal from a fixed structure against a rotating structure. Oil is used to cool and lubricate bearings in such engines, and this or other oil can also be used to cool rotating parts of the seal assemblies, the compartment walls and other mechanical or structural components that are located inside the bearing compartment.

Seals in the bearing compartment have two fundamental purposes, specifically to protect the compartment and its components from the surrounding hostile air environment, and to contain the oil within the compartment.

During operation, oil can weep through or burp out of the typical bearing compartment chamber seal. Such oil can find its way into the compressor system or turbine. In either case, this is unacceptable since bleeding into the compressor can lead to imbalance concerns or customer bleed contamination, such as fumes in the passenger cabin of an aircraft or other vehicle featuring the gas turbine engine.

On the other hand, oil leaking into the turbine region can lead to conditions where an auto-ignition could present a safety risk.

Brush seals have been considered as an alternative for these areas, because they can produce a better seal than labyrinth seals and do not require cooling like a carbon seal. However, brush seals in these areas can lead to unacceptable wear experienced by bristles of the brush seal during operation.

SUMMARY

According to one non-limiting configuration, a floating brush seal assembly comprises a ring-shaped housing defining a radially inwardly open internal cavity; a brush seal in the cavity and having bristles extending radially inwardly and offset to seal against a rotating body; a radial spring positioned to exert a radial inwardly directed force against the brush seal relative to the housing; and an axial spring positioned to exert an axially directed force against the brush seal relative to the housing.

In another non-limiting configuration, the housing has a backing plate and a side plate defining the cavity therebetween, and wherein the brush seal is between the backing plate and the side plate.

In a further non-limiting configuration, the axial spring is between the side plate and the brush seal.

In another non-limiting configuration, the brush seal comprises a ring-shaped bristle holder, and the bristles extend radially inwardly from the bristle holder.

In a further non-limiting configuration, cut out areas are provided in at least one of the bristle holder and the backing plate to reduce contact area between the bristle holder and the backing plate.

In another non-limiting configuration, a friction reducing coating is provided at points of contact between the bristle holder and the backing plate.

In a further non-limiting configuration, an anti-rotation member can be defined between the bristle holder and the housing to prevent rotation of the bristle holder relative to the housing.

In another non-limiting configuration, a floating gap is defined between a radially inwardly facing surface of the cavity and a radially outwardly facing surface of the bristle holder, and the radial spring is positioned in the floating gap.

In a further non-limiting configuration, the bristle holder is radially elastic so that a radial excursion of the rotating body against the brush seal moves the brush seal toward the radial spring, and the radial spring returns the bristle holder to a centered position after the radial excursion.

In another non-limiting configuration, combined force of the radial spring and force of friction between the bristle holder and the backing plate is less than or equal to expected force from an excursion of the rotating body through the bristles to the bristle holder.

In a further non-limiting configuration, the side plate is slidable axially into the backing plate, and a retaining device is provided for securing the side plate to the backing plate.

In another non-limiting configuration, a drain hole is provided in the housing to allow collected oil to flow past the seal assembly.

In a further non-limiting configuration, the axial spring comprises a flat ring having spring tabs elastically extending out of a plane of the flat ring to press against the brush seal.

In another non-limiting configuration, the radial spring comprises a resilient ring positioned between the housing and the brush seal to maintain the brush seal centered relative to the housing.

In another non-limiting configuration, a floating brush seal assembly comprises a ring-shaped housing defining a radially inwardly open internal cavity; a brush seal in the cavity and having bristles extending radially inwardly and offset to seal against a rotating body, wherein the brush seal is radially free-floating relative to the housing; and an axial spring positioned to exert an axially directed force against the brush seal relative to the housing.

BRIEF DESCRIPTION OF THE DRAWINGS

A detailed description of preferred embodiments follows, with reference to the attached drawings, wherein.

DETAILED DESCRIPTION

Figure 1:
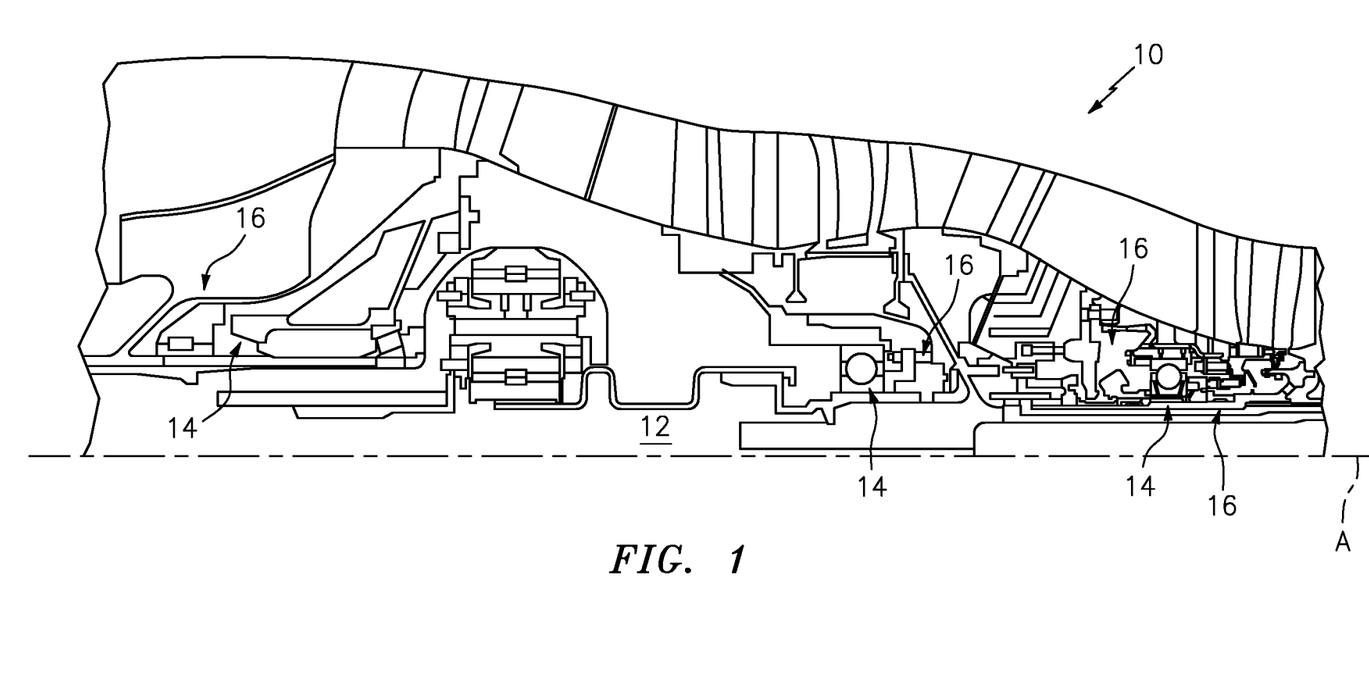
FIG. 1 shows a bearing compartment of a gas turbine engine.

The invention relates to a floating brush seal arrangement and assembly for a gas turbine engine. FIG. 1 shows a portion of a gas turbine engine 10 which includes a main shaft 12 which rotates around an axis A of engine 10. The main shaft can typically have a low spool and a high spool, both of which rotate about axis A, and which are supported by a number of bearings 14. The compartment which contains these bearings must be sealed so that oil which is typically used to cool and lubricate the bearings can be kept in place. Thus, a number of seals are positioned in different locations around the bearing compartment to protect the compartment and its components from the surrounding hostile air environment and to contain oil within the compartment.

FIG. 1 shows typical locations 16 of four different bearing compartment seals, any or all of which can benefit from the floating brush seal assembly disclosed herein. The four locations 16 are typically referred to, in order from left to right in the drawing, as the No. 1 seal, the No. 2 seal, the No. 3F seal and the No. 3R seal.

Figure 2:
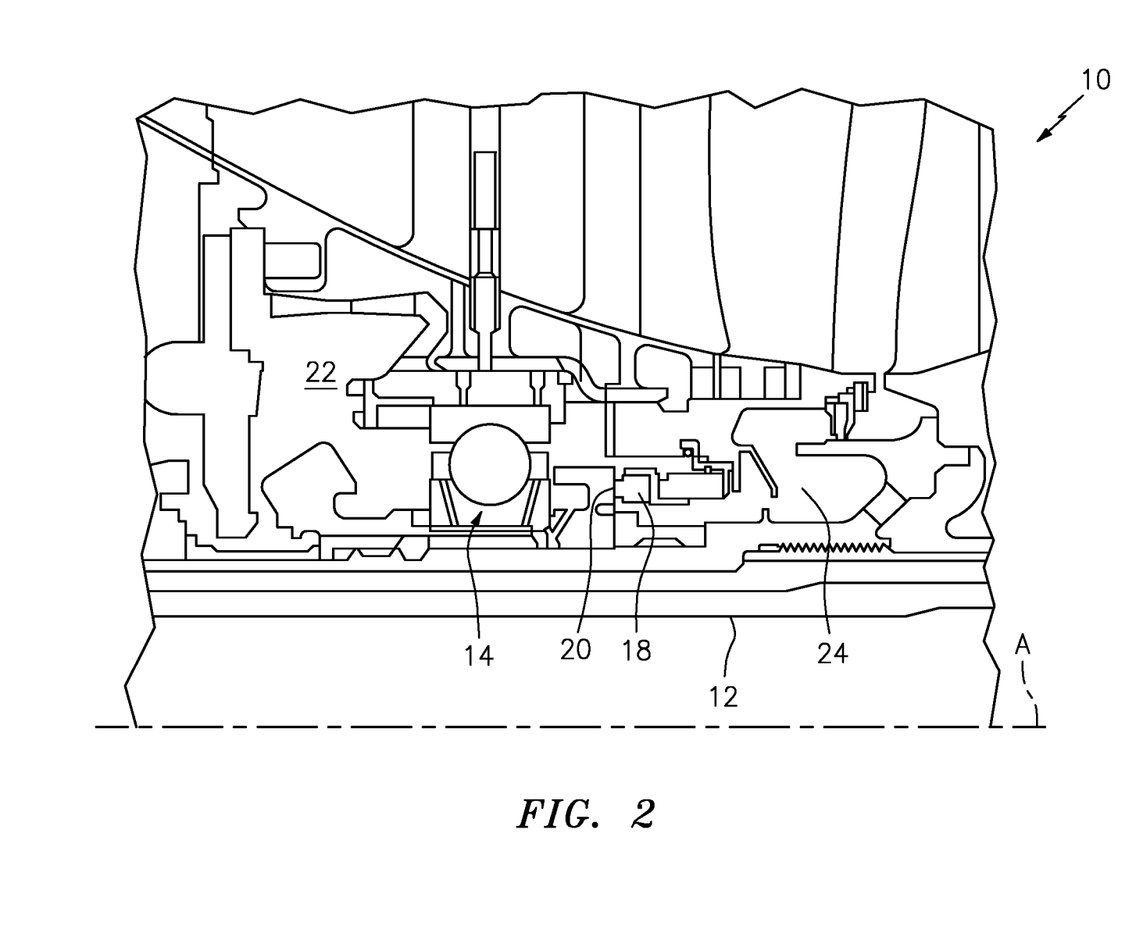
FIG. 2 shows an enlarged portion illustrating a mid-bearing compartment.

FIG. 2 shows an enlarged portion of FIG. 1, and illustrates a mid-bearing compartment, around shaft 12, and including a thrust bearing 14, a seal 18 and corresponding seal plate 20, and a low pressure zone 22 on one side of the seal 18 and seal plate 20, and a high pressure zone 24 on the other side of the seal 18 and seal plate 20. In a conventional configuration, seal 18 and seal plate 20 would be a carbon seal configuration, and such a configuration is further shown in FIG. 3.

Figure 3:
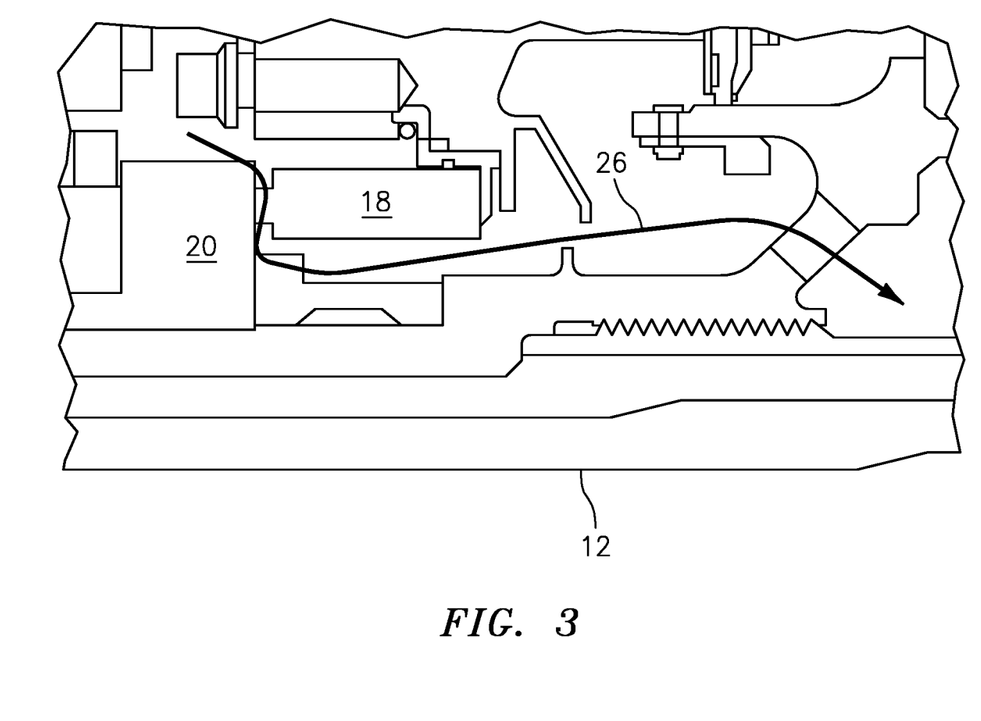
FIG. 3 is an enlarged portion of FIG. 2 showing typical oil weep path for a carbon seal.

FIG. 3 shows seal 18 as a carbon seal which is abutting against seal plate 20 to define a rotating seal assembly. FIG. 3 also shows a leakage path 26 which can be followed by oil escaping through the seal as discussed above, which can lead to various undesirable issues. The present disclosure relates to a brush seal assembly that is configured to produce a more robust seal against leakage 26, while also being configured to withstand and reduce friction and wear during normal operation, and also during an excursion, which is a condition that can happen during various stages of operation of a gas turbine engine wherein the shaft 12 or other rotating body, against which it is desired to maintain a seal, is displaced radially. Such excursion radial displacement can cause potentially serious issues of wear with conventionally mounted brush seals.

Brush seals in general have a bristle pack which comprises densely packed bristles made of a variety of materials (Haynes-25 or non-metallic material depending on the operational temperatures the seal will experience, as two non-limiting examples). The bristle pack can generally be welded between two plates, namely a backing plate facing the downstream pressure and a side plate facing the upstream pressure. Alternatively, the bristle pack can be assembled via a crimping operation performed on either the side plate or backing plate. These components are further discussed below, with reference to the drawings. The bristles are directed radially inwardly and are canted at an angle, for example of about 45 degree, and offset in the direction of rotation of the shaft or other rotating member against which they are to seal.

The function of the seal to minimize air leakage is significant since leakage cuts down efficiency of the engine, thereby increasing the fuel consumption and cost of operation. Further, the structure of the floating seal disclosed herein further establishes a roust seal against leakage of oil.

Wear on brush seal bristles can result from initial build interferences, thermal, centrifugal growth of rotating components, and interferences due to excursion of the rotor system. These conditions, either singularly or in combination, increase interference and bristle tip load or pressure which in turn increases wear. The brush seal arrangement disclosed herein addresses interference due to excursion of the rotor system.

Figure 4:
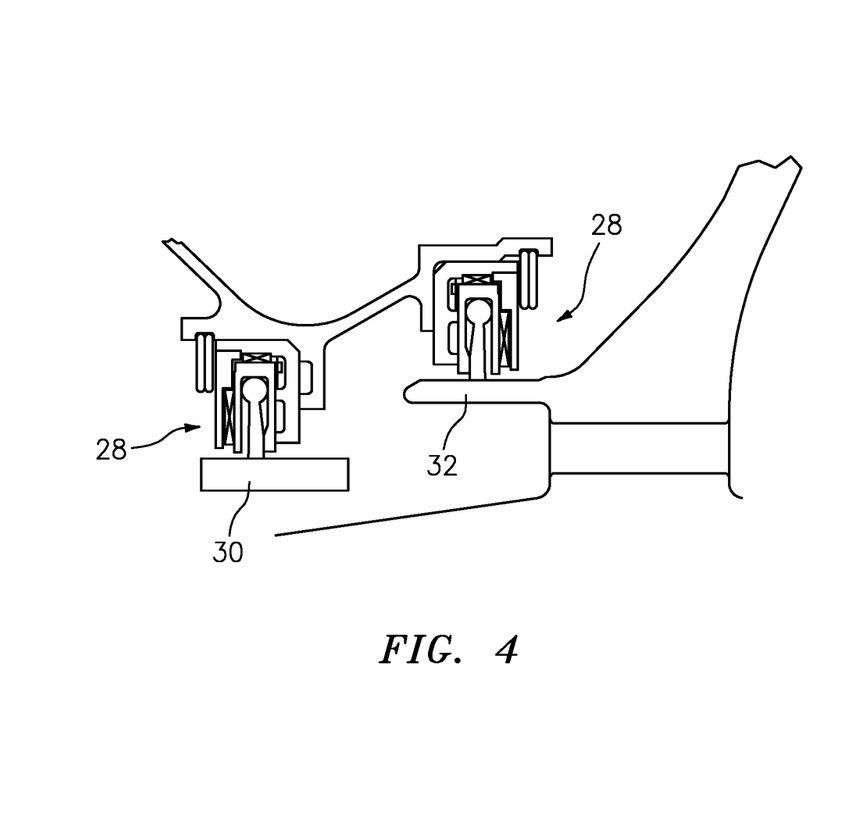
FIG. 4 shows a non-limiting configuration of a floating brush seal arrangement in a turbine area of a gas turbine engine.

FIG. 4 shows two floating brush seal assemblies 28 in a turbine area of the gas turbine engine. Each seal assembly 28 seals against a rotating body 30, 32, and is configured to effectively seal against body 30, 32, and also be able to withstand and re-center after an excursion of rotating body 30, 32. It should be appreciated that bodies 30, 32 could be different components mounted to the same shaft or spool, or could be components of different shafts or spools, for example with one body rotating with the low spool and the other body rotating with the high spool.

Figure 5:
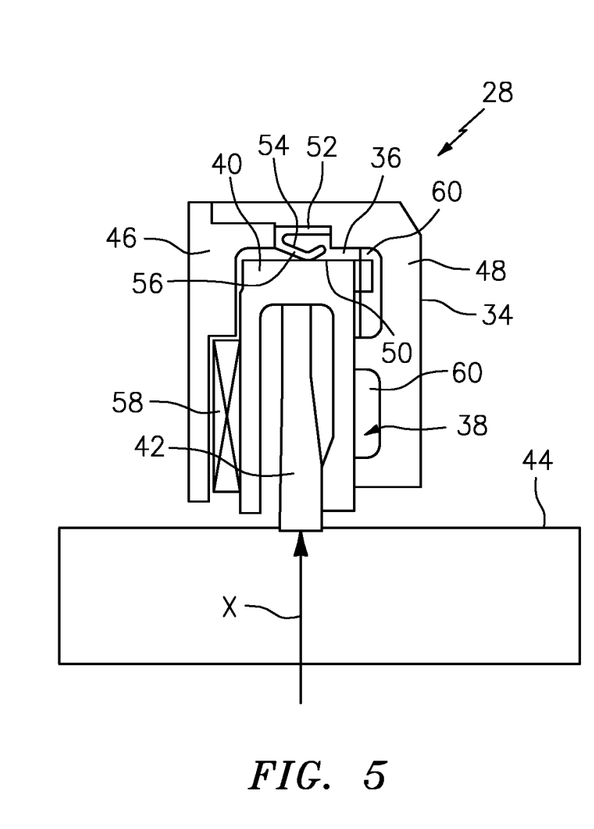
FIG. 5 shows a non-limiting configuration of a floating brush seal assembly.

FIG. 5 shows in greater detail a floating brush seal assembly 28. Assembly 28 has a housing 34 which defines an internal cavity 36 which is open in a radially inwardly direction. A brush seal 38 is positioned in cavity 36. Brush seal 38 has a bristle holder 40 and bristles 42 which extend radially inwardly from bristle holder 40. Bristles 42 extend into a sealing contact with a rotating body 44 which is schematically illustrated in FIG. 5, but which could be a rotating body such as a main shaft, a high or low spool, some other component mounted to such a member, or the like, for example also as schematically illustrated at 30, 32 in FIG. 4.

Housing 34 includes a side plate 46 and a back plate 48 which are spaced from each other to define cavity 36 therebetween. Side plate 46 and back plate 48 can be a single component, for example a single rail folded and welded into a ring-shaped structure, or could be separate members as shown in FIG. 5, which are mounted together in one or more of a variety of different ways.

The present disclosure is drawn to a floating mounting of bristle holder 40 in cavity 36 such that an excursion by rotating body 44, illustrated by an arrow X shown in FIG. 5, can be absorbed without imparting significant wear to the brush seal bristle pack, the seal assembly, or rotating body, and the seal returns to a centered and sealing position after the excursion due to the floating mount of the brush seal bristle pack as discussed further below.

Still referring to FIG. 5, bristle holder 40 has a radially outwardly facing surface 50, and housing 34 has a radially inwardly facing surface 52 which is spaced from surface 50 to define a radial gap 54 between surface 50 of bristle holder 40 and surface 52 of housing 34. This gap 54 allows radially outward movement of bristle holder 40, relative to housing 34, so that force from an excursion X can be absorbed through movement of bristle holder 40 and bristles 42. Radial gap 54 results in bristle holder 40 being mounted to radially float within housing 34 which already provides the benefit of allowing the bristle holder 40 to move in response to an excursion X such that the bristles 42 and other components are not damaged.

A radial spring 56 can be positioned in gap 54 and configured to apply a return force to bristle holder 40 after an excursion such that bristle holder 40 and bristles 42 can be returned to a centered position after an excursion. Allowing such movement during an excursion helps to reduce wear or damage to bristles 42 during the excursion, while radial spring 56 ensures return to proper position after the excursion so that continued good sealing can be maintained.

It should be appreciated that proper positioning of bristles 42 against rotating body 44 maintains a good seal against leakage between these components. This sealing capability can also be enhanced by radial spring 56 as discussed above. It should also be noted that leakage through the seal assembly, between bristle holder 40 and housing 34, is also to be avoided, and to that end an axial spring 58 can be positioned within housing 34 to press bristle holder 40 against housing 34, for example against back plate 48, and thereby prevent leakage through this area as well.

In FIG. 5, axial spring 58 pushes bristle holder 40 against back plate 48. During operation of the engine, high pressure is generated on the side plate side of the seal, and this high pressure increases the force pressing bristle holder 40 against back plate 48. The greater the force with which bristle holder 40 is pressed against back plate 48, the greater will be the force of friction resisting radial movement of bristle holder 40, for example during an excursion. Since this could result in damage to bristles in the bristle holder, back plate 48 can be provided with one or more cutouts 60 which reduce the area of contact between bristle holder 40 and back plate 48. Further, these points of contact can be provided with a low friction coating or treatment if desired, to even further reduce the force of friction which resists radial movement of bristle holder 40 relative to housing 34. Balancing the spring forces, friction forces and expected excursion forces is a consideration in providing a seal assembly which properly reacts to an excursion as discussed above. This is further illustrated with consideration of FIG. 6.

Figure 6:
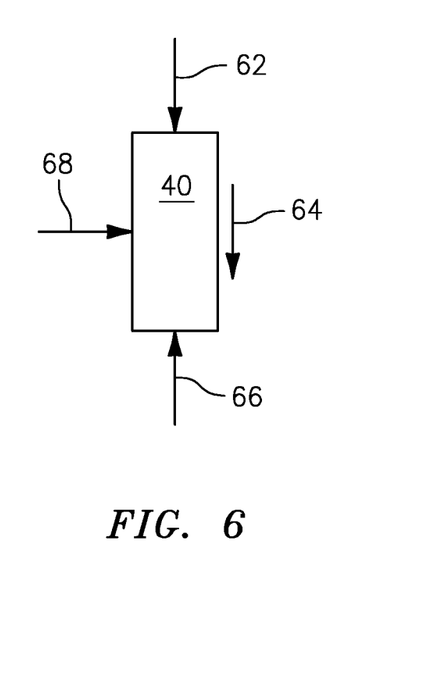
FIG. 6 illustrates forces to be balanced in selecting appropriate strength springs in a anon-limiting aspect of the disclosure.

FIG. 6 shows a schematic representation of bristle holder 40, and shows that radial spring force 62 and friction force 64 will act counter to an excursion force 66. Further, axial spring force and pressure induced force are represented at 68, and would serve to impact friction force 64. Taking these factors into account, in one non-limiting configuration, springs are selected and configured such that the force of an expected excursion 66 is greater than or equal to the combined radial spring force 62 and friction force 64. This ensures that an excursion will move bristle holder 40 radially outwardly, to absorb the excursion force through movement rather than deformation of bristles 42. This helps to avoid premature wear on bristles 42. Further, force 62 from the radial spring serves to move bristle holder 40 back to a centered position once the excursion is finished, so that bristles 42 are in proper sealing position relative to rotating body 44.

Figure 7:
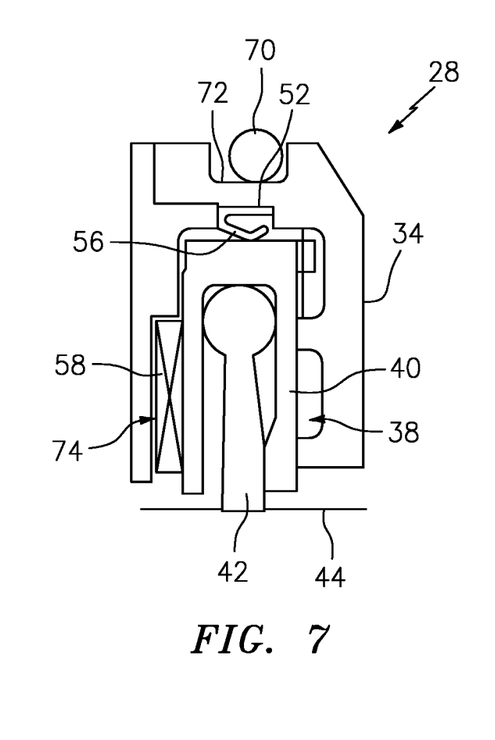
FIG. 7 illustrates an alternative non-limiting configuration of a floating brush seal assembly.
Figure 8:
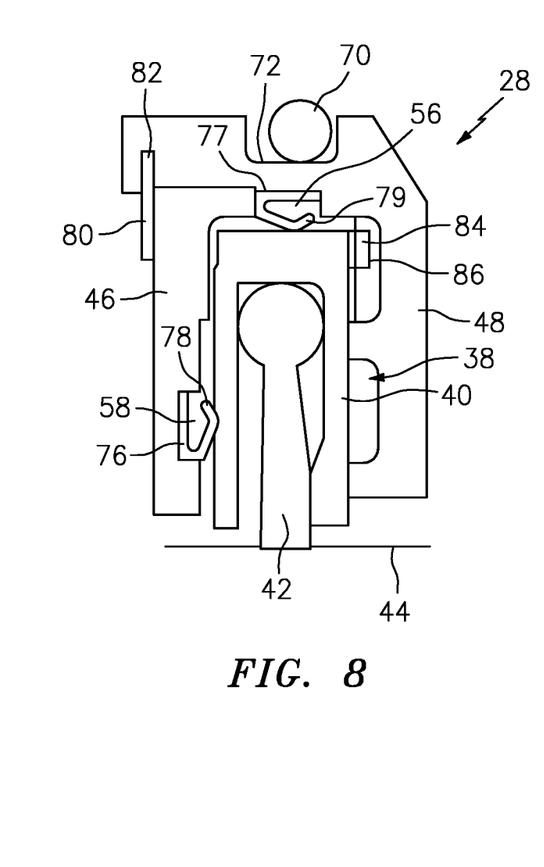
FIG. 8 illustrates another alternative non-limiting configuration of a floating brush seal assembly.
Figure 10:
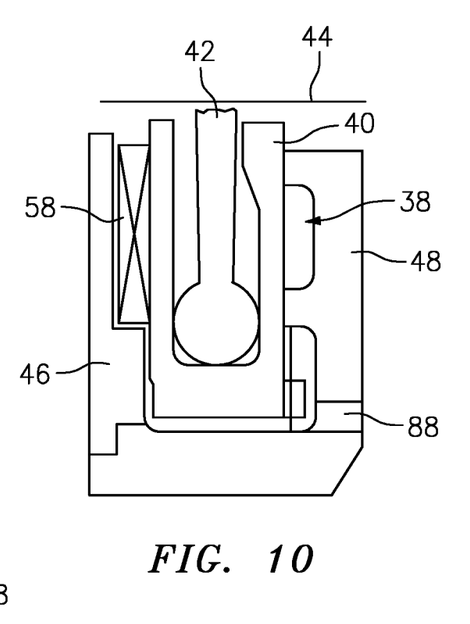
FIG. 10 illustrates another alternative non-limiting configuration of a floating brush seal assembly.

FIGS. 7, 8, and 10 show additional configurations of a seal assembly 28 including brush seal 38, bristle holder 40, bristles 42 and rotating body 44. Each of these figures is individually further discussed below.

FIG. 7 shows another non-limiting configuration of seal assembly 28 including an O-ring 70 which can be positioned in a radially outwardly facing groove 72 of housing 34 against the structure or support of the engine in which the seal is mounted. Of course, other types of seals could be utilized. FIG. 7 also shows that axial spring 58 can be mounted within a recess 74 to provide sufficient space for the spring 58. Further, radial spring 56 can likewise be mounted within a radial recess defined for example on surface 52, to provide sufficient space for the spring and also to hold the spring in position.

Figure 9:
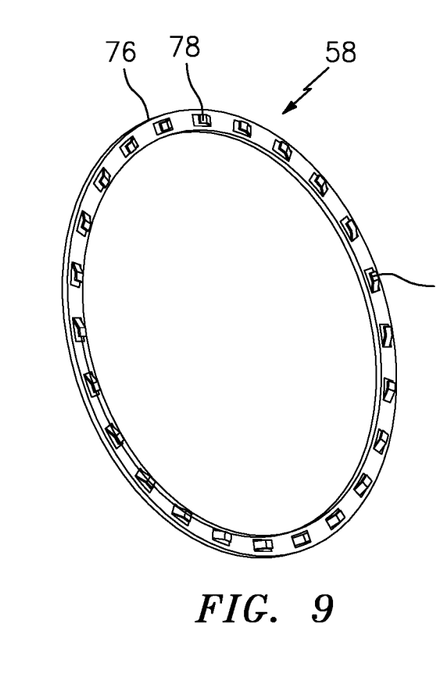
FIG. 9 illustrates an axial spring component of the configuration of FIG. 8.

FIG. 8 shows a further non-limiting configuration of seal assembly 28, wherein axial spring 58 is in the form of a flat ring 76 (See also FIG. 9) having a plurality of axially extending tabs 78 which exert spring force against bristle holder 40 in similar fashion to the axial spring 58 discussed above. In the configuration of FIG. 9, tabs 78 are angled along the ring-shaped extent of spring 58, rather than extending radially inwardly as shown in FIG. 8. Either of these configurations serves to produce the desired axial spring force as discussed above. Axial spring 58 can also be provided in the form of a wave washer, or any other of a broad possible selection of components which can produce the desired stable axial force.

It should also be appreciated that a similar structure can be utilized for radial spring 56, in the form of a ring-shaped member 77 having radially inwardly extending tabs 79 (See FIG. 8). Further, FIGS. 11-15 show alternative configurations of radial spring 56, including seal assembly 28, housing 34, bristles 42, and rotating body 44. These figures are further discussed individually below.

Figure 11:
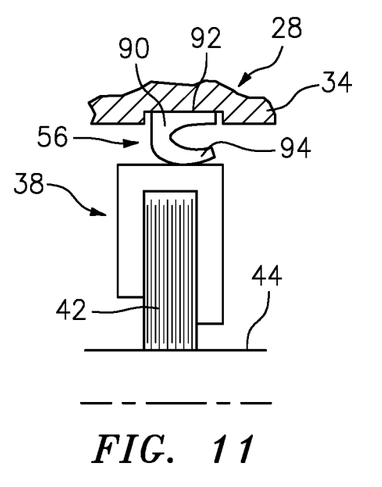
FIG. 11 illustrates an alternative non-limiting configuration of a radial spring for a floating brush seal assembly.

FIG. 11 shows radial spring 56 in the form of a lip seal 90 which can be made from PTFE (Teflon), Viton, or any other soft, oil resistant material. Lip seal 90 can be provided, for example, in the form of a resilient ring 92 having a lip 94 extending radially inwardly from ring 92, and contacting the brush seal 38.

Figure 12:
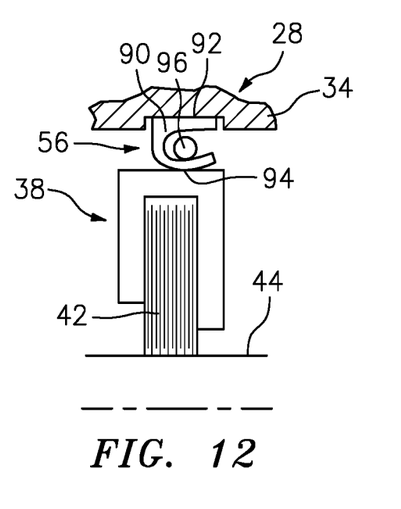
FIG. 12 illustrates another alternative non-limiting configuration of a radial spring for a floating brush seal assembly.

FIG. 12 shows another configuration wherein a lip seal 90 is provided similar to FIG. 11, but includes a garter spring 96 which surrounds lip seal member 94.

Figure 13:
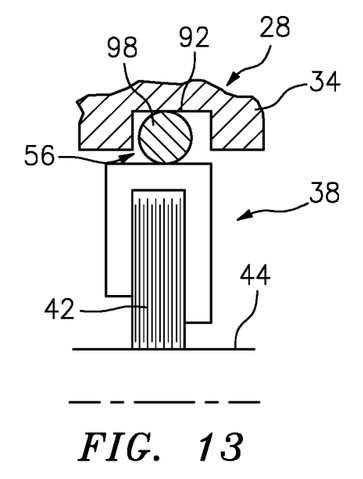
FIG. 13 illustrates another alternative non-limiting configuration of a radial spring for a floating brush seal assembly.

FIG. 13 shows a radial spring 56 in the form of a simple low durometer O-ring 98 which can be provided of suitable material to allow O-ring 98 to center the brush seal 38 relative to the housing 34.

Figure 14:
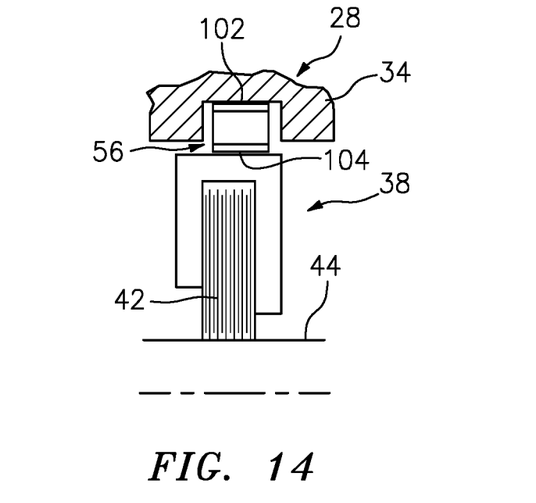
FIG. 14 illustrates another alternative non-limiting configuration of a radial spring for a floating brush seal assembly.
Figure 15:
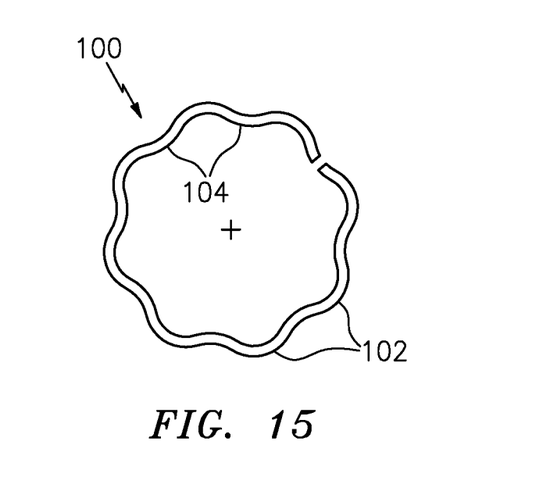
FIG. 15 further illustrates the configuration of FIG. 14.

FIGS. 14 and 15 illustrate another non-limiting configuration of radial spring 56, wherein the spring is in the form of a radial wave washer 100. As shown, such a radial wave washer can be provided in ring form and have an undulating profile to define radially outward surfaces 102 for contact with the housing, and radially inward surfaces 104 for contact with the brush seal 38.

It should be appreciated that all of the above configurations for the radial spring serve to keep the brush seal in a floating mount within the housing so that the brush seal can move with, and absorb, excursion movements from a shaft or other rotating body against which the brush seal is sealing.

It should also be appreciated that a floating brush seal as established within the broad scope of this disclosure does not require such a radial spring, and the brush seal can simply be free-floating within the housing. In this case, the brush seal would move radially primarily due to excursion of the shaft, and return of the shaft to a normal position.

FIGS. 5 and 7 show housing 34 as a two part assembly of side plate 46 and back plate 48. These plates can be joined together in a number of different ways, including with a press fit, or with mechanical joining, welding or the like. FIG. 8 shows further detail of one further non-limiting configuration wherein side plate 46 is held to back plate 48 with a retaining device 80 which can be mounted into a groove 82 in back plate 48. It should be appreciated that this configuration will allow a relatively easy step wise assembly of the seal, first deploying back plate 48, positioning radial spring 56 relative to back plate 48, then positioning bristle holder 40 and bristles 42 against back plate 48. It should be appreciated that with the configuration of radial spring 56 as illustrated, tabs 79 allow a pressing in of bristle holder 40 which can deflect tabs 79 radially outwardly as needed to allow smooth movement of bristle holder 40 into the position shown in FIG. 8. Axial spring 58 can then be either mounted into side plate 46, or placed against bristle holder 40, and then side plate 46 can be moved into position relative to back plate 48, again in the position shown in FIG. 8. Retaining device 80 can then be positioned into slot 82 to complete the assembly.

Still referring to FIG. 8, in another non-limiting configuration, an anti rotation member can be provided to prevent rotation of bristle holder 40 relative to housing 34. This can take the form of a post 84 or other protrusion extending from bristle holder 40 into a receptacle or recess 86 in back plate 48 or some other location of housing 34 such that when engaged, these structure hold bristle holder against rotation relative to housing 34. FIG. 8 shows this structure extending from bristle holder 40 into back plate 48, but it should be appreciated that the engaging structure could be reversed, or positioned between different components or portions of bristle holder 40 and housing 34, with equal effect.

FIG. 10 shows another non-limiting configuration wherein a drain hole 88 can be provided in housing 34 to allow oil to be re-introduced back into the bearing chamber. Drain hole 88 can advantageously be positioned at bottom dead center of housing 34 such that oil collecting in housing 34 and flowing to the bottom area of housing 34 reaches hole 88 and can pass back into the bearing compartment as desired. Oil which migrates through the seal collects at the bottom dead center of the seal assembly. During shut down and initial start-up, this oil can drain back into the compartment via gravity. During operation, both gravity and high pressure encourage oil to return to the compartment.

The brush seal arrangement as disclosed herein is designed to allow the brush seal to radially float within the cavity defined in the housing, for example between a side plate and back plate. The brush seal is axially loaded on the back plate side of the seal by either or both of the axial spring and buffer air. This improves stability of the brush seal within the cavity during operation and seals against a potential leak path of buffer air and/or compartment air or oil. The radial float margin is a function of extreme radial deflections, tolerances, thermals, and mechanical deflections which can occur during an excursion.

As disclosed above, the axial spring can consist of a non-metallic c-seal or a metallic ring with a series or plurality of flexible tabs that provide the spring force, or can be a wave washer, that is, a washer having a wave extending in and out of the plane of the washer, and comprised of resilient material such that the waves can exert a sufficient axial spring force. The axial load imparted onto the brush seal by either the buffer air and/or spring element must be sufficient to maintain the bristle housing in contact with the cavity wall such as the back plate, but not so great as to inhibit radial movement of the brush seal under rotor/shaft excursions.

The radially acting spring element contacts the outside diameter of the brush seal and the inside diameter of the cavity, and provides a means of re-centering the brush seal following a radial excursion.

Axial and radial spring forces can be selected such that they are not larger than the force imparted onto the brush seal bristles. This is to ensure that the brush seal translates radially during excursions and reduces wear of bristles.

It should be appreciated that brush seal assemblies as disclosed herein can be arranged in tandem and have buffer pressure air enter either the inside diameter or outside diameter to seal the compartment or air cavity desired. When in tandem, the brush seal assemblies can seal against runners or other rotating bodies which need not have the same diameter or rotation speed.

The foregoing description is exemplary, and various non-limiting embodiments are disclosed herein. However, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be considered to determine true scope and content.

What is claimed is:

1. A floating brush seal assembly, comprising:
a ring-shaped housing defining a radially inwardly open internal cavity;
a brush seal in the cavity and having bristles extending radially inwardly and offset to seal against a rotating body;
a radial spring positioned to exert a radial inwardly directed force against the brush seal relative to the housing; and
an axial spring positioned to exert an axially directed force against the brush seal relative to the housing, wherein the housing has a backing plate and a side plate defining the cavity therebetween, and wherein the brush seal is between the backing plate and the side plate, and wherein the side plate is slidable axially into the backing plate, and further comprising a retaining device for securing the side plate to the backing plate, wherein the backing plate has a radially extending component and an axially extending component, and wherein the side plate is radially enclosed by the axially extending component of the backing plate.

2. The assembly of claim 1, wherein the axial spring is between the side plate and the brush seal.

3. The assembly of claim 1, wherein the brush seal comprises a ring-shaped bristle holder, and wherein the bristles extend radially inwardly from the bristle holder.

4. The assembly of claim 3, further comprising cut out areas in at least one of the bristle holder and the backing plate to reduce contact area between the bristle holder and the backing plate.

5. The assembly of claim 4, further comprising a friction reducing coating at points of contact between the bristle holder and the backing plate.

6. The assembly of claim 3, further comprising an anti-rotation member defined between the bristle holder and the housing to prevent rotation of the bristle holder relative to the housing.

7. The assembly of claim 3, wherein a floating gap is defined between a radially inwardly facing surface of the cavity and a radially outwardly facing surface of the bristle holder, and wherein the radial spring is positioned in the floating gap.

8. The assembly of claim 3, wherein the bristle holder is radially elastic so that a radial excursion of the rotating body against the brush seal moves the brush seal toward the radial spring, and the radial spring returns the bristle holder to a centered position after the radial excursion.

9. The assembly of claim 3, wherein combined force of the radial spring and force of friction between the bristle holder and the backing plate is less than or equal to expected force from an excursion of the rotating body through the bristles to the bristle holder.

10. The assembly of claim 1, further comprising a drain hole in the housing to allow collected oil to flow past the seal assembly.

11. The assembly of claim 1, wherein the axial spring comprises a flat ring having spring tabs elastically extending out of a plane of the flat ring to press against the brush seal.

12. The assembly of claim 1, wherein the radial spring comprises a resilient ring positioned between the housing and the brush seal to maintain the brush seal centered relative to the housing.

13. A floating brush seal assembly, comprising:
- a ring-shaped housing defining a radially inwardly open internal cavity;
- a brush seal in the cavity and having bristles extending radially inwardly and offset to seal against a rotating body, wherein the brush seal is radially free-floating relative to the housing;
- an axial spring positioned to exert an axially directed force against the brush seal relative to the housing, wherein the housing has a backing plate and a side plate defining the cavity therebetween, and wherein the brush seal is between the backing plate and the side plate, and wherein the side plate is slidable axially into the backing plate, and further comprising a retaining device for securing the side plate to the backing plate; and
- wherein the backing plate has a radially extending component and an axially extending component, and wherein the side plate is radially enclosed by the axially extending component of the backing plate.

14. The assembly of claim 1, wherein the retaining device is mounted in a groove in the backing plate and extends radially inwardly from the groove to capture the side plate within the backing plate.

* * * * *